G. J. STANTON.
ICELESS REFRIGERATOR.
APPLICATION FILED JAN. 14, 1919.

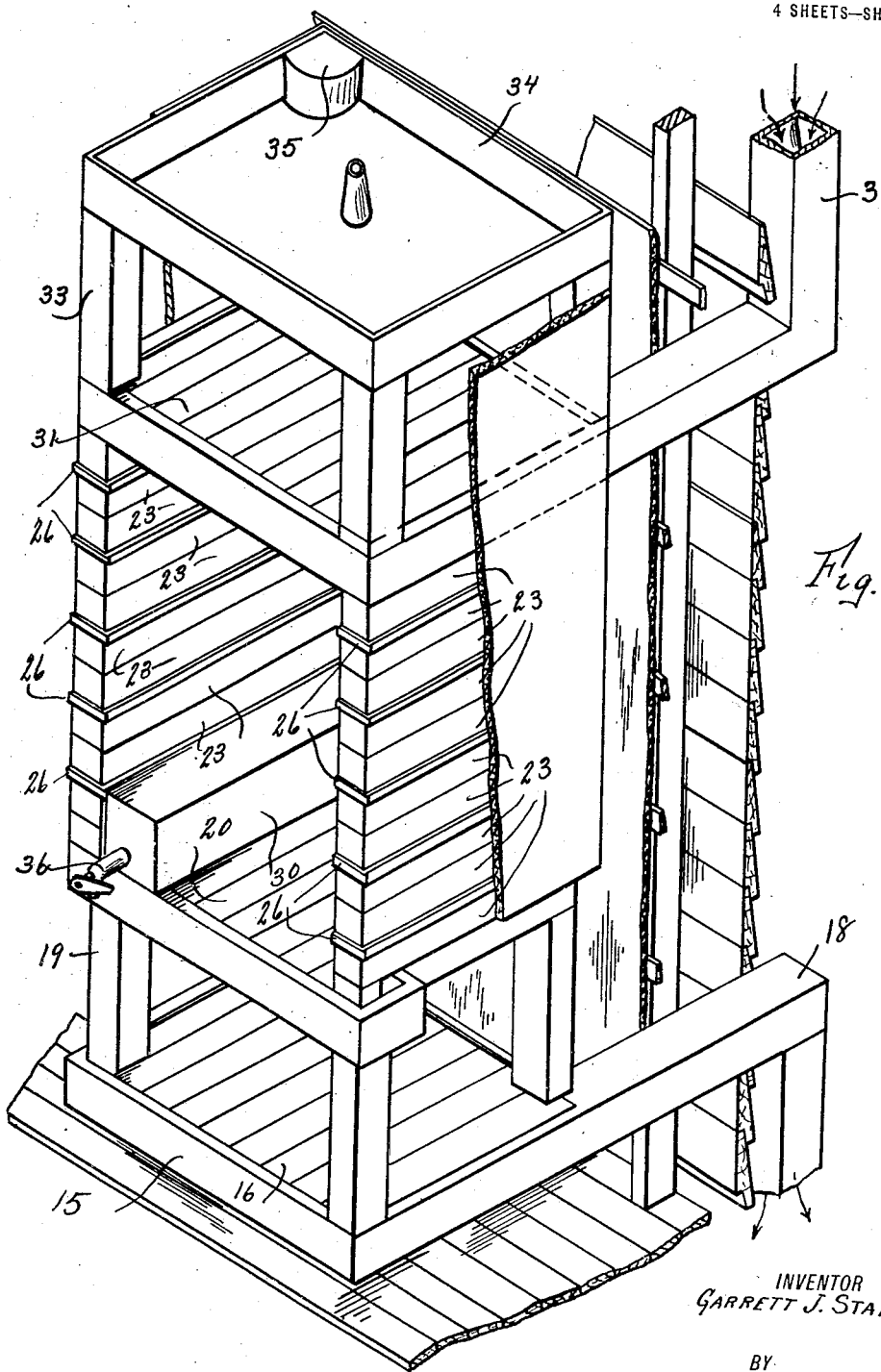

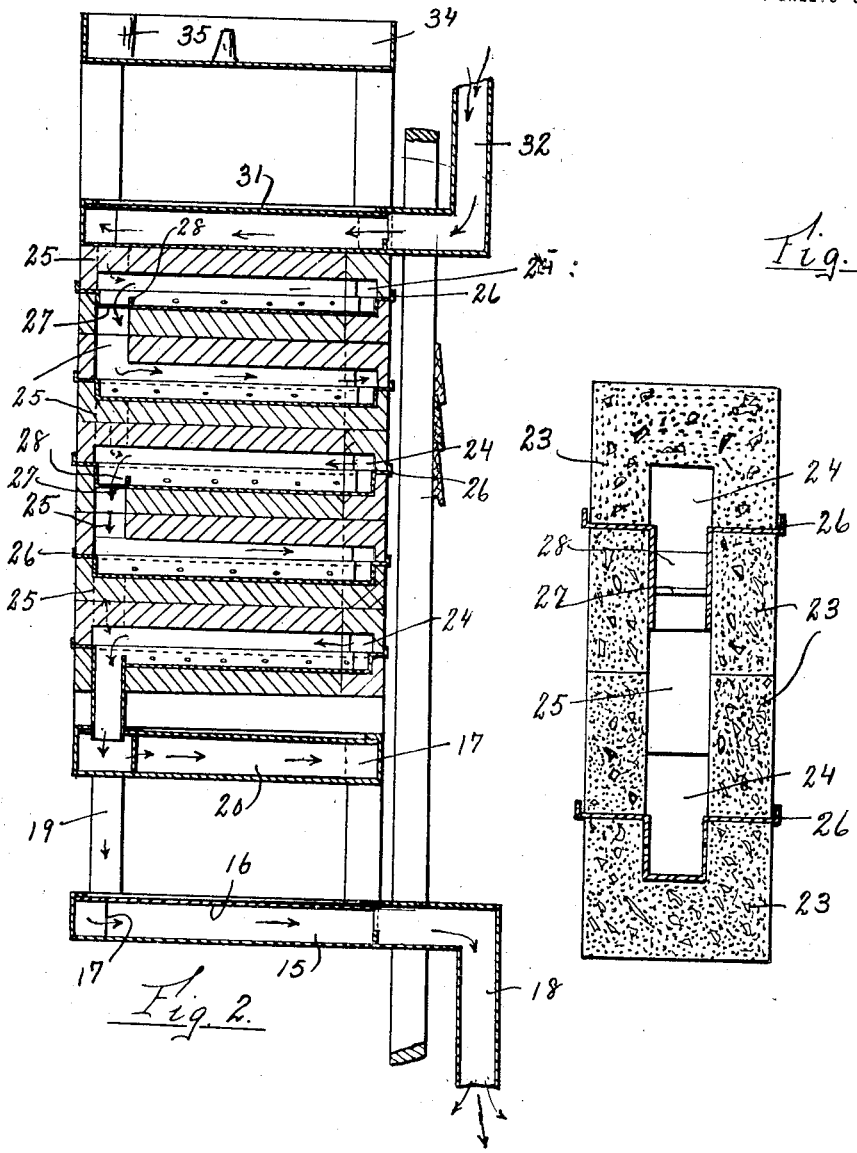

1,348,823.

Patented Aug. 3, 1920.
4 SHEETS—SHEET 3.

INVENTOR
GARRETT J. STANTON

BY
Martell & Co.
ATTORNEYS.

G. J. STANTON.
ICELESS REFRIGERATOR.
APPLICATION FILED JAN. 14, 1919.
1,348,823.
Patented Aug. 3, 1920.
4 SHEETS—SHEET 4.
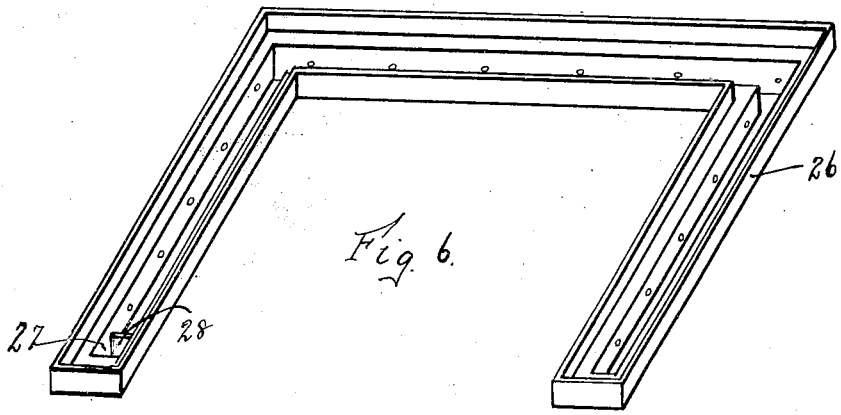
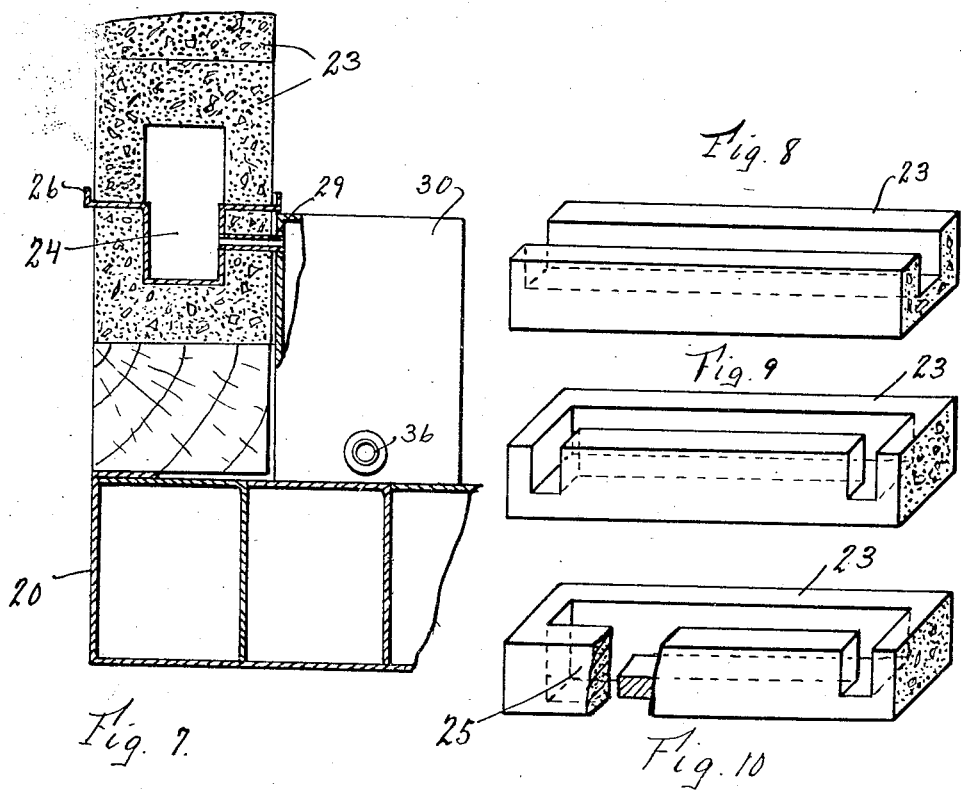
INVENTOR
GARRETT J. STANTON
BY
Martell & Co.
ATTORNEYS.

UNITED STATES PATENT OFFICE.

GARRETT J. STANTON, OF LOS ANGELES, CALIFORNIA.

ICELESS REFRIGERATOR.

1,348,823.  Specification of Letters Patent.  Patented Aug. 3, 1920.

Application filed January 14, 1919. Serial No. 271,005.

*To all whom it may concern:*

Be it known that I, GARRETT J. STANTON, a citizen of the United States, residing at Los Angeles, in the county of Los Angeles and State of California, have invented certain new and useful Improvements in Iceless Refrigerators, of which the following is a specification.

My invention relates primarily to a refrigerator for use for domestic purposes in preserving food stuffs and the like, but it may be adapted and likewise used for any purpose to which refrigerators are at present used, and the object thereof is to provide a device of the above character which will be cheap, simple and efficient in construction and operation and which will require the minimum amount of care after its installation.

Other objects and advantages will appear hereinafter and while I have shown and will describe the preferred form of my invention it will be understood that I do not limit myself to such preferred form, but that various changes and adaptations may be made therein without departing from the spirit of my invention.

In the drawings accompanying and forming a part of this application:

Figure 1, is a perspective view, partly broken away of my invention.

Fig. 2 is a sectional side elevation of Fig. 1.

Fig. 3 is an enlarged detail of a portion of my invention.

Fig. 6 is a perspective view of one of the water distributing pans.

Fig. 7 is an enlarged sectional elevation of a portion of my device showing the connection from the water distributing pan to the water filter.

Figs. 8, 9 and 10 are perspective views of the different form of tile used in constructing my invention.

Figure 4:
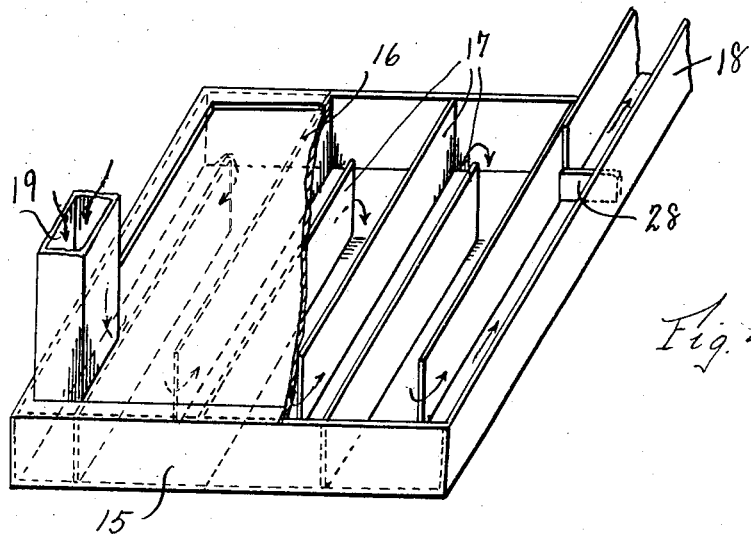
Fig. 4 is a broken-away perspective of one of the shelves on my refrigerator.
Figure 5:
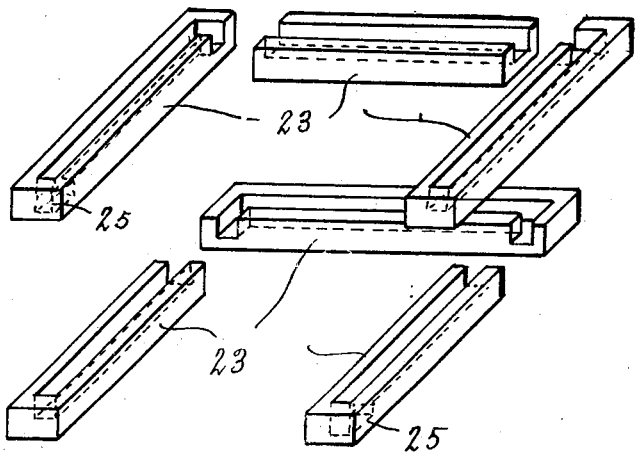
Fig. 5 is a perspective detail showing the method of breaking the joints of the tile in constructing my invention.

Referring to the drawings 15 represents the bottom or base of my refrigerator, and may rest upon the floor or be elevated at a distance thereabove, comprising a substantially shallow rectangular pan provided with a cover 16 and a plurality of oppositely mounted baffle plates 17 extending transversely thereof, these baffle plates forming a narrow channel extending from one corner to the opposite corner, said channel terminating at one end in an outwardly extending flue 18 and at its other end in an upwardly extending flue 19. Flue 18 passes through the wall of the building and then extends downwardly at right angles to near the ground, and flue 19 extends upwardly and connects to the bottom of a shelf 20, at one end of the channel therein. Shelf 20 is similar in all respects to shelf 15 with the exception that the connections at the end of the channel therein are in the top and bottom walls respectively, the opening in the bottom wall connecting to flue 19 as previously stated, and the opening in the top wall connecting to one end of the channel in the wall members 23. Mounted upon the upper face of shelf 20, at the outer edges thereof are a plurality of, substantially U-shaped in elevation, tile members 23. Members 23 are substantially U-shaped in cross section and are mounted in pairs with the tile of each pair mounted in opposed relation to each other whereby a continuous rectangular channel 24 is formed extending entirely around the wall and being closed at the ends. I have shown these members 23 as being formed of a plurality of sections but this is mainly for convenience in handling and manufacture and may be formed as a unit if desired. At one termination of channel 24 is formed an upwardly extending passage 25 which extends upwardly and connects to the channel in the next adjacent course of tile, these passages being positioned at opposite ends of each course so that a continuous channel is formed the entire height of the wall, this channel passing first in one direction and then in the reverse direction. Mounted upon alternate members 23 is a water distributing pan 26 which is shaped in cross section corresponding to the cross-sectional shape of the upper face of the member 23 upon which it is mounted, it being understood that the channel in the member upon which it is mounted opens upwardly. These pans 26 are preferably formed of metal and the side walls of the portion thereof which fit within the channel of the members 23 are perforated at a distance above the bottom. Pans 26 are provided at the ends of the channels therein with ports or openings to correspond with the openings or passages in the tile members 23 so as to not obstruct the channel heretofore mentioned. A dam 28 is provided to extend across the channels in pans 26 at the end of openings 27 for a purpose hereafter explained. It will be understood that as many pairs of members 23 may be used as is necessary to build the refrigerator to the desired height.

The lowermost pan 26 has the perforations omitted and has extending from the side thereof a pipe or tube 29, which tube connects to a filter 30. Mounted upon the upper face of the topmost pair of members 23 is a shelf 31, similar in all respects to shelf 15, with the exception that the outlet flue 32 extends to atmosphere through the wall of the building and the inlet flue connects to the opening 25 in the end of the channel 24 in the said topmost member 23. Suspended at a distance above shelf 31 is a water supply tank 34, provided at one corner thereof with a filtering medium 35, through which water is filtered and flows into the channel in shelf 31, and thence through the channels in said shelf into the channels in the members 23 and to and through the channels in shelves 20 and 15 and thence out through flue 18 to atmosphere.

The purpose of the dams in the end of the channels is to hold the water at a constant level in said channels and the perforations are for the purpose of allowing the water to percolate therethrough into the tile members 23 which are of absorbent plastic material such as concrete, clay, gypsum, etc. The bottom pan 26 having the perforations omitted disposes of its excess water through pipe 29 into filter 30 from whence it may be drawn by cock 36. Any suitable or desirable covering may be provided for my refrigerator. I have shown wood paneling but burlap may be substituted therefor if desired or any other material. In the latter case the upper ends of the burlap would be extended into the water tank and the water thus permitted to percolate through the burlap to the ground thereby providing an additional cooling medium for outside use.

In operation the water tank will be filled with water, any suitable means being provided for this purpose. The water will filter downwardly through filter 35 into the channel in the upper shelf 31 to the height of the dam. It will then overflow said dam and pass downwardly through opening 25 into the end of the channel in the topmost member 23 and will flow around the same and overflow its dam and pass downwardly into the channel in the next lowest member 23, repeating this until it passes out to atmosphere through flue 18. At the same time air is entering flue 32 and passing above the water in the direction which the same is flowing, flows through the channels and out to atmosphere through flue 18 in shelf 31. It will thus be seen that as the air flows downwardly it will absorb heat from the water thus cooling the same and the water percolating through the tile members will cool the same and draw heat from the atmosphere within the refrigerator thus cooling the interior of the same.

It may sometimes be deemed necessary or desirable to line the interior of my refrigerator with burlap or other fabric and I wish it understood that I may do so without departing from the spirit of my invention.

Having described my invention what I claim and desire to secure by Letters Patent is:

1. An iceless refrigerator comprising shelves having baffle plates therein whereby an endless channel is formed, a connection from one end of the channel in the lowermost shelf to atmosphere and from the other end of said channel to one end of a similar channel in a superposed shelf, the other end of said last channel being connected to atmosphere; means to maintain a constant level of water in said channels whereby air passing therethrough will cool said water.

2. An iceless refrigerator having shelves provided with a continuous channel therethrough, and walls of absorbent material, a continuous channel extending through said walls in alternate directions the entire height of the wall, all of said channels being connected together whereby a continuous channel is formed for the passage of air therethrough.

3. In an iceless refrigerator a hollow shelf provided with a plurality of baffle plates therein whereby a continuous channel is formed therein, the ends of said channel being connected to atmosphere.

4. An iceless refrigerator having hollow shelves superposed one above the other and spaced apart; baffle plates in said hollow shelves whereby a continuous channel is formed therein, one end of the channel in the lowermost shelf being connected to atmosphere and one end of the channel in the uppermost shelf being connected to atmosphere; walls formed of a plurality of pairs of hollow tile, said tile being substantially U-shaped in cross section and the tile of each pair being mounted reversely to each other whereby a continuous channel is formed in each course; a connection between opposite ends of said channels whereby a continuous channel is formed the entire height of the wall; the ends of said continuous channel being connected to the channels in said shelves and forming a continuous channel throughout said shelves and walls; a metallic lining for said wall channels; means to maintain a constant level of water in said channel; and means to supply water thereto.

5. A refrigerator having hollow walls and shelves; a continuous channel extending through said shelves and walls and being connected at its ends to atmosphere whereby a current of air will be allowed to pass therethrough.

6. A refrigerator having hollow walls and shelves; a continuous channel extending through said walls and shelves and being connected at its ends to atmosphere whereby a current of air will be allowed to pass therethrough; a water supply; and means to maintain a constant water level in said channel.

7. A refrigerator having hollow walls and shelves and a continuous channel extending through said walls and shelves and being connected at its ends to atmosphere; means to maintain a constant level of water in said channel and means to permit water to percolate through said walls; and a water supply for said channels.

8. A refrigerator having walls formed of a plurality of pairs of tile, said tile being U-shaped in cross section and being mounted reversely to each other in each course whereby a continuous channel is formed extending the entire length of each course but closed at the ends; a connection from the channel in each course to the channels in the adjacent courses, the connection to one course being at one end and the connection to the other course being at the other end of said channel whereby a continuous channel is formed through the entire height of the wall.

In witness that I claim the foregoing I have hereunto subscribed my name this 21st day of December 1918.

GARRETT J. STANTON.